United States Patent
Gentry

(10) Patent No.: US 9,376,208 B1
(45) Date of Patent: Jun. 28, 2016

(54) ON-BOARD REDUNDANT POWER SYSTEM FOR UNMANNED AERIAL VEHICLES

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/662,097

(22) Filed: Mar. 18, 2015

(51) Int. Cl.
  *B64C 39/02* (2006.01)
  *B64D 27/24* (2006.01)
  *B64D 27/02* (2006.01)

(52) U.S. Cl.
  CPC ............. *B64C 39/024* (2013.01); *B64D 27/24* (2013.01); *B64C 2201/024* (2013.01); *B64C 2201/042* (2013.01); *B64C 2201/044* (2013.01); *B64C 2201/066* (2013.01); *B64C 2201/128* (2013.01); *B64C 2201/145* (2013.01); *B64D 2027/026* (2013.01); *Y10S 903/93* (2013.01)

(58) Field of Classification Search
  CPC ............ B64C 39/024; B64C 2201/066; B64C 2201/024; B64C 2201/042; B64C 2201/044; B64C 2201/145; B64C 2201/128; B64D 27/24; B64D 2027/026; Y10S 903/93
  USPC .......................................................... 701/8
  See application file for complete search history.

(56) References Cited

U.S. PATENT DOCUMENTS

| | | | | |
|---|---|---|---|---|
| 7,954,579 | B2* | 6/2011 | Rodriguez | B60W 10/08 180/65.265 |
| 9,046,892 | B2* | 6/2015 | Jang | G05D 1/0088 |
| 9,056,676 | B1* | 6/2015 | Wang | B64C 39/024 |
| 2006/0026017 | A1* | 2/2006 | Walker | H04L 63/302 701/31.4 |
| 2010/0121587 | A1* | 5/2010 | Vian | G01R 31/3651 702/63 |
| 2012/0058377 | A1* | 3/2012 | Sastry | H01M 2/1077 429/94 |
| 2012/0209456 | A1* | 8/2012 | Harmon | B64C 39/024 701/3 |
| 2013/0266827 | A1* | 10/2013 | Sastry | H01M 2/1077 429/7 |
| 2014/0236388 | A1* | 8/2014 | Wong | B64C 27/08 701/2 |
| 2015/0041598 | A1* | 2/2015 | Nugent | H02J 17/00 244/53 R |

\* cited by examiner

*Primary Examiner* — McDieunel Marc
*Assistant Examiner* — James E Stroud
(74) *Attorney, Agent, or Firm* — Lee & Hayes, PLLC

(57) ABSTRACT

An unmanned aerial vehicle ("UAV") is configured with a redundant power generation system on-board the UAV. A redundant power system on-board the UAV can selectively utilize an auxiliary power source during operation and/or flight of the UAV. The power system on-board the UAV may include a battery and at least one auxiliary power source comprising a combustion engine. The combustion engine on-board the UAV may be selectively operated to charge the battery when a charge level of the battery is below a full charge level, and/or to power one or more propeller motors of the UAV.

20 Claims, 6 Drawing Sheets

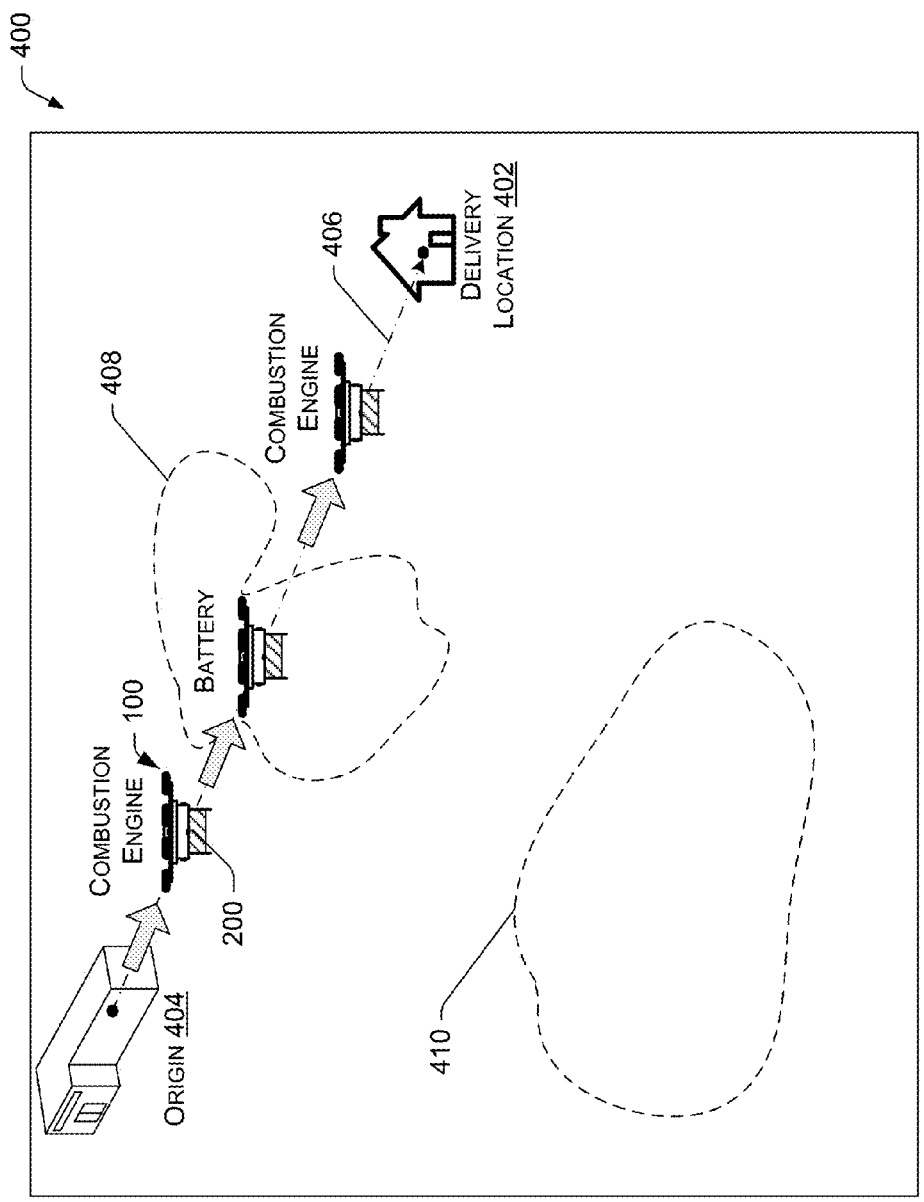

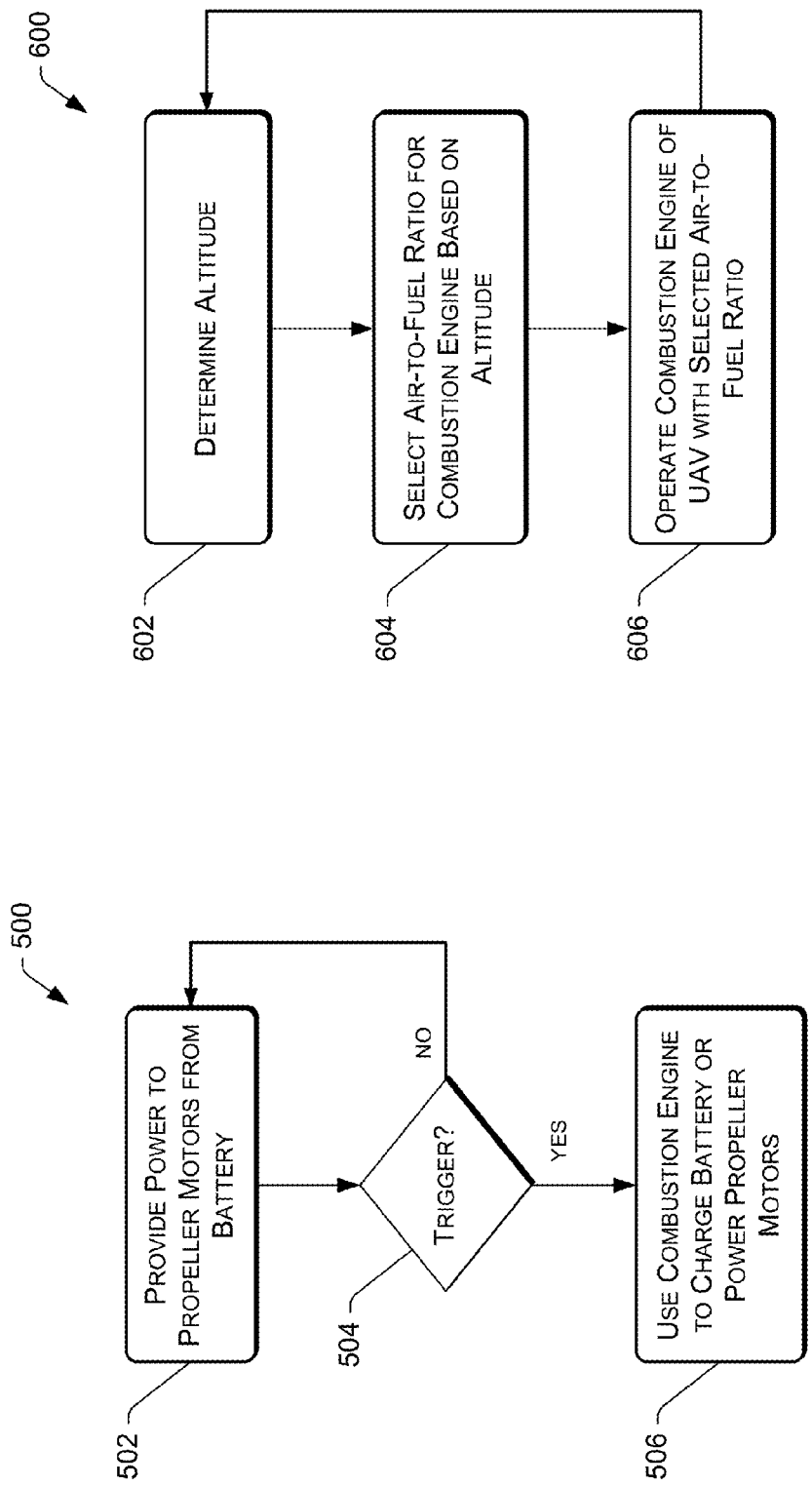

ON-BOARD REDUNDANT POWER SYSTEM FOR UNMANNED AERIAL VEHICLES

BACKGROUND

Unmanned aerial vehicles (UAVs), sometimes referred to as drones, or automated aerial vehicles (AAVs), are used by hobbyists, some commercial entities, and various militaries. UAVs offer unique advantages, such as the ability to make UAVs smaller in overall size and lightweight as compared to their counterpart manned aerial vehicles (e.g., human-piloted helicopters and fixed wing aircraft). Many small UAVs operate using electric motors that are powered by a battery.

Battery-powered UAVs present a challenge in their control and operation because they have flight times (the amount of time the UAV 100 can fly before having to recharge its battery) that may be limited by the batteries that power them. Although many factors can influence the actual flight time of a battery-powered UAV (e.g., weight, speed, etc.), current battery technology limits the flight time of a typical battery-powered UAV to between about 20-30 minutes, depending on the type, size, and weight of a particular UAV. This is a significant constraint, at least for commercial entities that plan to utilize UAVs for flights that are longer than 30 minutes. For example, a commercial entity may plan to use a battery-powered UAV to deliver an inventory item to a delivery location and return the UAV to a fulfillment center, which may involve a round trip flight that is longer than the flight time permitted by the battery of the UAV. Moreover, the limited flight time of battery-powered UAVs may present a safety concern.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a schematic diagram of an example technique for selectively utilizing a redundant power source on-board the UAV in defined areas.

FIG. 5 is a flow diagram of an illustrative process for selectively utilizing a redundant power source on-board the UAV in response to a trigger event.

FIG. 6 is a flow diagram of an illustrative process for selecting an air-to-fuel ratio for a combustion engine on-board the UAV based on altitude.

DETAILED DESCRIPTION

Figure 1:
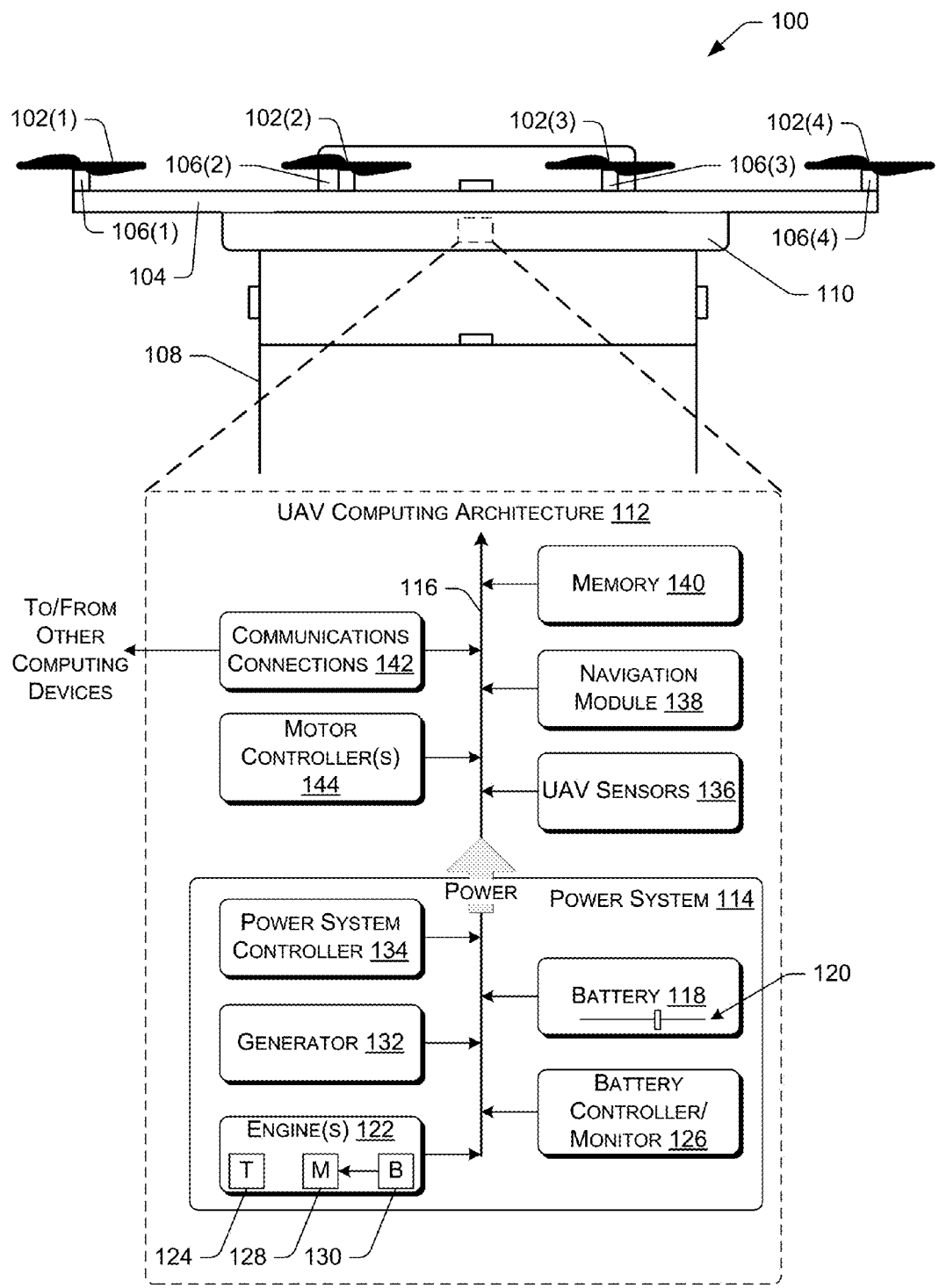
FIG. 1 is a side elevation view of an illustrative unmanned aerial vehicle (UAV), FIG. 1 further illustrating a block diagram of an illustrative computing architecture of the UAV, including a power system having an on-board redundant power source.

This disclosure is directed to an unmanned aerial vehicle ("UAV") and systems, devices, and techniques pertaining to redundant power generation on-board the UAV. The redundant power system of the UAV can extend a flight time of the UAV as compared to the UAV operating solely on battery power. Furthermore, use of the redundant power system may ensure that the UAV reaches its intended destination. Thus, the redundant power system can selectively utilize an auxiliary power source during operation and/or flight of the UAV to extend the flight time of the UAV, and/or improve energy efficiency.

The power system on-board the UAV may include a battery and at least one auxiliary power source comprising one or more combustion engines. The battery may be configured to act as a primary/default power source that provides power to one or more propeller motors of the UAV, and the auxiliary combustion engine offers redundancy to the power system of the UAV. To this end, a combustion engine on-board the UAV may be utilized to charge the battery when a charge level of the battery is below a full charge level. The combustion engine may additionally, or alternatively, be utilized as a direct power source for powering the one or more propeller motors of the UAV, and perhaps other electrical components of the UAV.

Accordingly, the power system may further include a generator to convert kinetic energy from the combustion engine into electrical energy that can be utilized either to charge the battery or to power the electric propeller motors of the UAV. Regardless of how the energy from the combustion engine is utilized, its use may be "selective" in that the combustion engine may be used based on one or more factors, such as when one or more criteria are satisfied. To this end, the power system of the UAV may further include a power system controller to determine when to utilize the combustion engine to charge the battery and/or to power the propeller motors of the UAV. The power system controller may respond to various trigger events during operation and/or flight of the UAV that allow for selective utilization of the combustion engines.

The UAV may be implemented as virtually any type of aircraft. In some implementations, the UAV may be a multi-rotor (multi-propeller) vertical takeoff and landing vehicle, such as a quadcopter, octocopter, or any other multi-rotor aerial vehicle. While the implementations of the UAV discussed herein utilize propellers to achieve and maintain flight, in other implementations, the UAV may be configured in other manners. For example, the UAV may include at least one fixed wing and/or a combination of both propellers and fixed wings to provide at least some upward lift during forward flight of the UAV. The UAV may be configured to transition from rotor flight to a fixed-wing flight during operation. For example, the UAV may utilize one or more propellers to enable takeoff and landing, and a fixed wing configuration or a combined wing-and-propeller configuration to sustain forward flight while the UAV is airborne, such as by redirecting propellers from a lift configuration to a forward propulsion configuration when the UAV includes at least one wing that provides upward lift.

As such, in selected embodiments, the UAV may comprise a plurality of lifting motors in a substantially horizontal orientation to provide substantially vertical thrust (i.e., in a direction opposite the pull of gravity) and one or more "pushing" motors oriented at an angle (e.g., 90 degrees) relative to the lifting motors to provide horizontal thrust (i.e., in a direction transverse to gravity). In such embodiments, the lifting motors may be engaged to maneuver the UAV to a desired flight altitude where the pushing motors may be engaged to provide at least a component of horizontal thrust during horizontal flight. Depending on the aerodynamic capabilities of the UAV (e.g., wings, control surfaces, etc.), the speed of some or all of the lifting motors may be reduced while the pushing motors are engaged to conserve battery capacity. In certain embodiments, the pushing motors providing horizontal thrust may comprise electric motors connected to an electrical power source in a manner similar to the lifting motors. Nonetheless, in alternative embodiments, the pushing propellers may be driven by a combustion engine. As would be understood by those having ordinary skill, a combustion engine may be connected to a pushing propeller by a selectable coupling (e.g., a magnetic coupling) capable of allowing the combustion engine to drive an electrical generator without rotating the pushing propeller. Similarly, those having ordinary skill will appreciate that a selectable coupling may also be positioned between the combustion engine and the electrical generator, such that horizontal thrust may be provided by the combustion engine without operating the generator.

FIG. 1 is, in part, a side elevation view of an illustrative unmanned aerial vehicle (UAV) 100. As illustrated, the UAV 100 includes a plurality of propellers (also called rotors) 102. FIG. 1 illustrates four propellers 102(1), 102(2), 102(3), and 102(4) that are visible from the side elevation view of FIG. 1. The propellers 102 may be any form of propeller (e.g., graphite, carbon fiber, etc.), and the propellers 102 may be of a size sufficient to lift the UAV 100 and any inventory/payload engaged by the UAV 100 so that the UAV 100 can navigate through the air, for example, to deliver an inventory item to a delivery location (or destination). The propellers 102 may be spaced about a frame 104 of the UAV 100, and positioned at various locations on the UAV 100. It is to be appreciated that FIG. 1 is merely an illustrative example of a UAV 100, and as such, the UAV 100 may include any number of propellers 102, including more or fewer propellers than the number illustrated by FIG. 1. In addition, alternative methods of upward and/or forward propulsion may be utilized. For example, fans, jets, turbojets, turbo fans, jet engines, and the like may be used to propel the UAV 100.

The UAV 100 may further include one or more propeller motors 106. In some implementations, there may be a one-to-one correspondence between the propellers 102 and the propeller motors 106. FIG. 1 illustrates this scenario by showing four propeller motors 106(1), 106(2), 106(3), and 106(4), each propeller motor 106 being configured to rotate a corresponding propeller 102. However, a one-to-many relationship is contemplated as well. For example, a single propeller motor 106 may power multiple propellers 102. This configuration may be enabled by a gear train or similar drive assembly from the propeller motor 106 to the propellers 102 associated with the particular propeller motor 106. For inventory transport purposes, the propeller motors 106 may be any form of motor capable of generating enough speed and torque with the propellers 102 to lift the UAV 100 and any engaged inventory thereby enabling aerial transport of the inventory/payload. For example, the propeller motors 106 may each be a FX-4006-13 740 kilovolt (kV) multi rotor motor. The propeller motors 106 may be any form of motor (e.g., permanent magnet, brushless, etc.). In some implementations, the mountings of the propeller motors 106 may be adjustable (e.g., rotatable) such as to enable use of at least some of the propellers 102 to create forward propulsion during forward flight.

In some implementations, the UAV 100 includes an inventory engagement mechanism 108. The inventory engagement mechanism 108 may be configured to engage and disengage items and/or containers that hold items of various sizes and weights. For example, the inventory engagement mechanism 108 may comprise movable (e.g., rotatable and/or translatable) members that move in a particular manner to engage or disengage a container or an item. The inventory engagement mechanism 108 may be positioned beneath (or on an underside of) the UAV 100 so that the UAV 100 may be brought down upon a container or an item to engage inventory with the inventory engagement mechanism 108. In some implementations, the UAV 100 may include additional inventory engagement mechanisms. The inventory engagement mechanism 108 may be of any size sufficient to securely engage and disengage containers that contain inventory. In other implementations, the inventory engagement mechanism 108 may operate as the container, containing the inventory item(s) to be delivered.

In some implementations, the UAV 100 may include a housing 110 that encloses internal components of the UAV 100, and/or the frame 104. At least some of the internal components are shown in block diagram form as components that make up a computing architecture 112 of the UAV 100. The architecture 112 includes a power system 114 having various components coupled to a bus 116 so that the power system 114 can provide power to various components of the UAV 100 that require electricity to operate, such as the propeller motors 106. In one implementation, the bus 116 may be configured to coordinate input/output (I/O) traffic between various components of the architecture 112. In some implementations, the bus 116 may perform any necessary protocol, timing, or other data transformations to convert data signals from one component into a format suitable for use by another component. In some implementations, the bus 116 may include support for devices attached through various types of peripheral buses, such as a variant of the Peripheral Component Interconnect (PCI) bus standard or the Universal Serial Bus (USB) standard, for example. In some implementations, the bus 116 may be split into two or more separate components, such as a north bridge and a south bridge, for example.

The power system 114 may include a battery 118 that is configured to provide electrical power to various components of the UAV 100, such as the propeller motors 106. The battery 118 may be considered the primary or default power source of the power system 114. In other words, the UAV 100 may default to powering the components of the UAV 100 using the battery 118 unless a trigger event indicates that auxiliary power of the power system 114 is to be utilized. The battery 118 may include, but is not limited to, the following types of batteries: lithium ion (e.g., lithium iron phosphate, lithium cobalt oxide, other lithium metal oxides, etc.), lithium ion polymer (commonly abbreviated as Li-poly, Li-Pol, LiPo, LIP, PLI, or Lip), nickel metal hydride, nickel cadmium, nickel hydrogen, nickel zinc, silver zinc, and so on. For example, the battery 118 may comprise a 6000 milliamp hour (mAh) lithium-ion polymer battery. The battery 118 is coupled to the propeller motors 106 via the bus 116 in order to provide power to the propeller motors 106 for propelling the UAV 100 by rotating the propellers 102.

The battery 118 may be rechargeable so that electrical energy may be provided to, and stored within, the battery 118 to replenish any depleted energy of the battery 118 (i.e., a charge level 120 is increased as a result of charging the battery 118). Accordingly, the UAV 100 may be equipped with an electrical charging port (not shown) that is coupled to the power system 114 and configured to receive a corresponding connector that delivers power from an external power source (e.g., a wall outlet). In this manner, a charging port may be used for charging the battery 118 when the UAV 100 is not in operation. For example, the battery 118 may be charged by plugging the UAV 100 into a wall outlet when the UAV 100 is stationed in a fulfillment center in between flights.

Additionally, the battery 118 may be charged by an on-board, redundant power source of the power system 114. A suitable auxiliary power source for this purpose is shown in FIG. 1 as at least one combustion engine 122. The combustion engine 122 generates power by injecting fuel into the engine 122 and burning (combusting) the fuel. As such, the engine 122 may include a fuel tank 124 for storing fuel, such as a liquid or solid fuel. Suitable fuels that may be stored in the fuel tank 124 include, without limitation, petroleum fuels (e.g., natural gas, liquefied petroleum gas (LPG), gasoline, kerosene, light (low viscosity) oil, heavy (high viscosity) oil, etc.), synthetic fuels (e.g., synthetic gasoline), alcohols (e.g., methanol, ethanol, etc.), nitromethane, nitrogen-hydrogen compounds (e.g., ammonia and hydrazine), and/or solid fuels (e.g., coal, charcoal, solid-fuel pellets, etc.).

In some implementations, the combustion engine 122 may be configured to combust a relatively lightweight solid fuel for emergency situations. For example, in the unlikely scenario that the battery 118 fails and a first order combustion engine 122 runs out of liquid fuel (e.g., gasoline or nitromethane fuel), an additional (backup) combustion engine 122 may store lightweight solid fuel in its fuel tank 124, such as a solid propellant grain composition that can be burned. Burning of such a solid propellant can produce hot gas that exits a nozzle on the UAV 100 at a high velocity to provide thrust to propel the UAV 100. The weight of the solid fuel may be advantageous for minimizing the overall weight of the UAV 100 during normal operation while providing an emergency backup power source that can avoid catastrophic situations from occurring. In one example, the solid propellant may comprise a plasticizer, a binder, a fuel, and an oxidizer.

The power system 114 may also include a battery controller/monitor 126 (sometimes referred to as the "battery controller 126", or the "battery monitor 126") to transfer energy output by an auxiliary power source (e.g., the combustion engine 122) to the battery 118 so that the energy can be stored within the battery 118, thereby replenishing any depleted charge level 120 of the battery 118. The battery controller/monitor 126 may include, or operate in conjunction with, a charging circuit for charging the battery 118. The battery controller/monitor 126 may determine and select a charge rate for supplying the electrical energy to the battery 118. The charge rate that is selected may be specified in terms of an amount of time it takes to charge the battery from a fully depleted charge level 120 (roughly 0%) to a maximum capacity charge level 120 (roughly 100%). The charge rate may be chosen for accomplishing various objectives, such as for replenishing the battery 118 to a threshold charge level within a predetermined period of time, for optimizing battery performance (i.e., an optimal charge rate that will maximize the lifespan of the battery 118).

As its name implies, the battery controller/monitor 126 may also be configured to monitor the charge level 120 of the battery 118. The battery controller/monitor 126 may monitor a current supplied by the battery 118 via a Coulomb calculator or a similar device. Alternatively, the battery controller/monitor 126 may monitor a voltage level of the battery 118, which may be determined from a known resistance of the battery 118 and a monitored level of current.

Returning to the combustion engine 122, the engine 122 may represent any number of combustion engines, including as few as a single combustion engine 122 or multiple combustion engines 122 (e.g., 2, 3, 4, and so on). In this manner, multiple "layers" of power redundancy can be provided beyond a single combustion engine 122 (e.g., if a first engine 122 doesn't start, another engine 122 can be started), and the scalability of adding additional combustion engines 122 may be limited predominantly by the size of the engines 122 and/or the size of the UAV 100.

In some implementations, the combustion engine 122 comprises a nitromethane engine that runs on nitromethane fuel (commonly referred to as "nitro"). The oxygen content of nitro-methane enables it to burn with much less atmospheric oxygen as compared to its gasoline counterpart, which allows nitromethane engines to generate more power than gasoline engines given the same amount of oxygen available for combustion. Nitromethane fuel also has a laminar combustion velocity that is higher than the combustion velocity of gasoline, making it useful for high speed engines.

FIG. 1 illustrates that each engine 122 may include a dedicated, electric starting motor 128, and a dedicated battery 130. The dedicated starting motor 128, is configured to start the combustion engine 122, and is powered by the dedicated battery 130. The dedicated battery 130, allows the power system 114 to start the engine 122 in situations where the battery 118 is rendered useless. For example, if the battery 118 goes unstable and fails unexpectedly (a scenario known to occur with lithium polymer batteries), the dedicated battery 130, of the engine 122 can be used to start the engine 122. This is particularly helpful in situations where restoration of power to the UAV 100 can prevent the UAV 100 from falling out of the sky and crashing to the ground. The capacity of the dedicated battery 130 may be limited to a capacity suitable for powering the dedicated starting motor 128.

In some implementations, the engine 122 may be started using the electric starting motor 128 that is itself powered from the battery 118, or one or more cells of the battery 118. In other implementations, an additional (failsafe), or alternative, starting mechanism, such as a one-time use explosive charge (e.g., an explosive cartridge), can be provided in the power system 114 and used to start the engine 122. Such a one-time use explosive charge may be used in failsafe situations where the battery 118 and/or the dedicated batter 130 fails.

The power system 114 may further include a generator 132 configured to convert kinetic energy received from the combustion engine 122 into electrical energy. As the combustion engine 122 produces work by burning fuel, the energy from the combustion engine 122 may be used to drive the generator 132. In this sense, the generator 132 may comprise any suitable generator, such as a generator comprising coils of wire surrounded by magnets. When the coils are moved (e.g., rotated) through the magnetic fields created by the surrounding magnets, current is induced in the wire of the coils, thereby creating electricity.

In operation, the combustion engine 122 receives fuel from the fuel tank 124 and generates work in the form of mechanical (e.g., rotational) energy in response to the combustion of the fuel in the engine 122. The engine 122 is coupled to the generator 132 for providing electrical energy, which may be transferred to the battery 118 for charging via the battery controller/monitor 126, and/or to other components (e.g., the propeller motors 106) to power those components. As a result, once the fuel tank 124 is filled with at least some fuel, the power system 114 becomes a self-contained charging system (i.e., a fully autonomous charging system) that requires no external connections or exterior power for recharging the battery 118, or powering the UAV 100 when the battery 118 is rendered inoperable or otherwise depleted of charge/energy. The generator 132 also allows for implementation of electric propeller motors 106.

The power system 114 may further include a power system controller 134 configured to selectively start, and thereafter utilize, the combustion engine 122 for various purposes. That is, the power system controller 134 is configured to decide (i) when to utilize the combustion engine 122, and (ii) how to use the combustion engine 122. In order to switch between the battery 118 and the combustion engine 122, the power system controller 134 may include switching functionality, circuitry, or the like. In a mixed-power mode, where both the battery 118 and the combustion engine 122 provide power to the UAV 100, the power system controller 134 may control or select a distribution of power that is drawn from each of the battery 118 and the combustion engine 122 (e.g., selecting a distributions of power that is comprised of 60% battery power and 40% combustion engine power). Similarly, the power system controller 134 may be configured to vary the duty cycle of either the combustion engine 122 or the battery 118 so that each may be operated at a maximum power output, or at a fraction of the power output they are capable of providing.

As noted above, the combustion engine 122 may be utilized to charge the battery 118 via the generator 132 and the battery controller/monitor 126. The power system controller 134 may decide to utilize the engine 122 to charge the battery 118 in response to a trigger event, such as when the charge level 120 is critically low, or when the charge level 120 is insufficient for completing a current mission (e.g., a remaining portion of a round-trip flight). In this sense, the power system controller 134 decides when to use the combustion engine 122 to charge the battery 118, such as when the charge level 120 drops below a threshold charge level, and/or when an extension of flight time is needed to complete a flight to a destination.

The power system controller 134 may also decide when to utilize the combustion engine 122 to provide power directly to the electrical components of the UAV 100. For example, an emergency situation (e.g., failure of the battery 118) may trigger the activation of the combustion engine 122 to restore power directly the UAV 100. In this manner, the combustion engine 122 can be used as an on-demand, backup power source to power the UAV 100 in the event of battery failure or other types of emergency situations. As another example, the battery 118 may have an insufficient charge level 120 to complete a mission/journey, and, in response, the combustion engine 122 may be used to power the flight of the UAV 100 for a remainder of the mission so that the UAV 100 does not crash during a last leg of the trip. In some implementations, other "non-emergency" trigger events may be used to determine when it is appropriate to utilize the combustion engine 122 for powering the UAV 100. For example, the combustion engine 122 may be used to power the UAV 100 for certain types of flight (e.g., cruising or forward flight), at certain altitudes, in permitted areas, and so on.

In some implementations, the power system controller 134 may be configured to operate the UAV 100 in different power modes that are defined by the sources providing the power used to propel the UAV 100. For example, a "battery-power mode" may be implemented by powering the UAV 100 solely from the battery 118. An "engine-power mode" may be implemented by powering the UAV 100 solely from the combustion engine 122. A "mixed-power mode" may draw power from both the battery 118 and the combustion engine 122. A "gliding mode" may fly the UAV 100 without the propeller motors 106 drawing any power from the battery 118 or the combustion engine 122, such as when the UAV 100 includes at least one fixed wing that provides upward lift when the UAV 100 is traveling in forward flight.

The power system controller 134 may receive input from various components of the UAV 100, such as UAV sensors 136, and/or the battery controller monitor 126. The UAV sensors 136 provide sensed parameters that can be utilized to decide whether to start the combustion engine 122 for charging the battery 118 and/or powering the UAV 100. The UAV sensors 136 may include, without limitation, a location sensor (e.g., a global positioning system (GPS) receiver), an inertial measurement unit (IMU) including an accelerometer, a gyroscope, and/or a magnetometer, a speed/velocity sensor (or speedometer), a revolutions per minute (RPM) sensor, a payload weight sensor for measuring the weight of inventory (a payload) carried by the UAV 100, a vibration profile sensor, an altimeter (e.g., a barometric altimeter), a fuel gauge, a temperature sensor or thermal sensor, a power output sensor configured to sense the instantaneous power that is output by the power system 114 during operation of the UAV 100, an image capture device, an infrared sensors, a time of flight sensors, a pressure sensor, a weather sensor, an airflow sensor, and so on.

Figure 2:
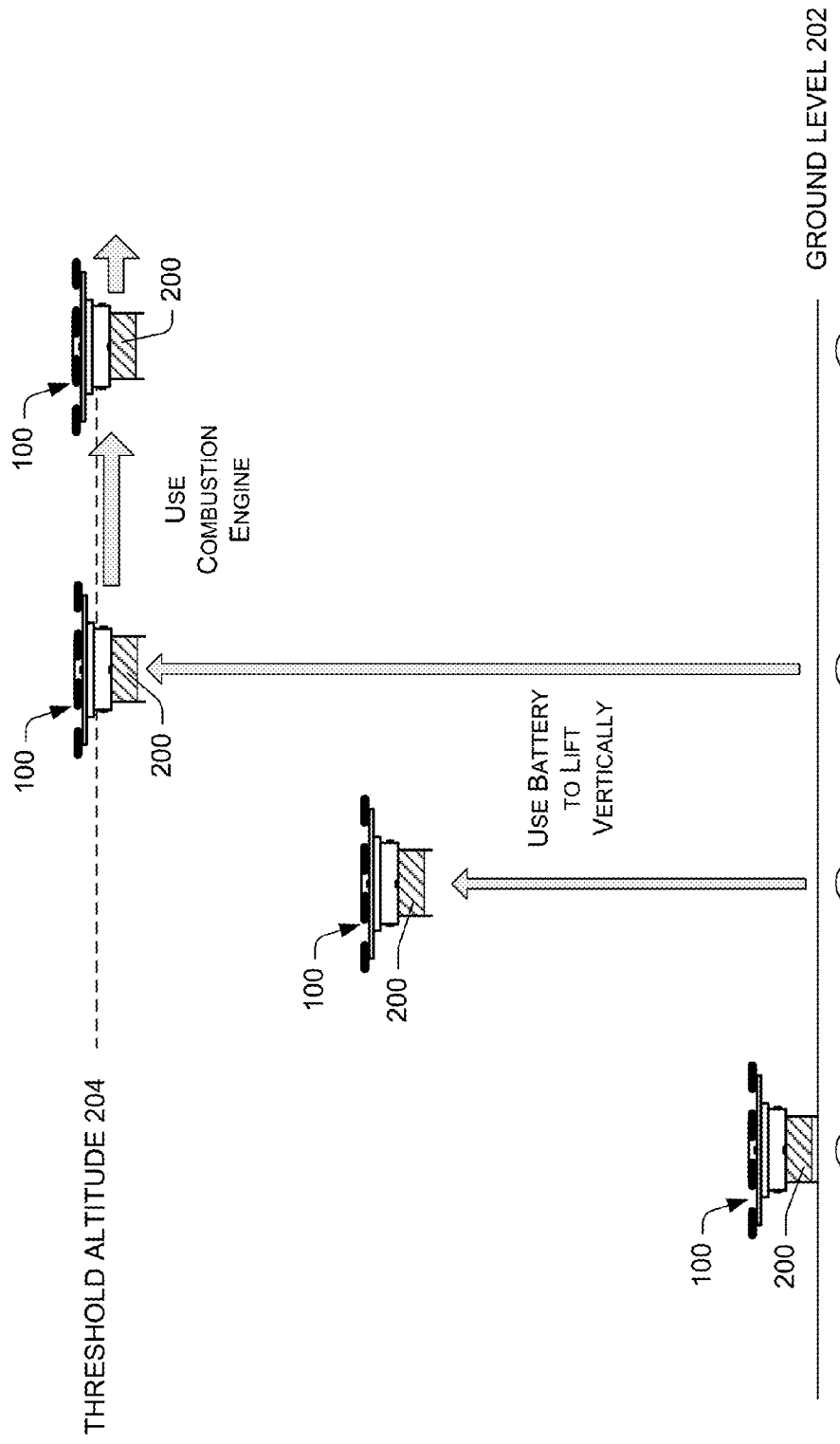
FIG. 2 is a schematic diagram of an example technique for selectively utilizing a redundant power source on-board the UAV during forward flight of the UAV and/or at a threshold altitude.

Before completing the discussion of the architecture 112 of FIG. 1, FIGS. 2-4 will be described to illustrate various techniques of selectively utilizing the combustion engine 122. Turning first to FIG. 2, a schematic diagram is shown to illustrate an example technique for selectively utilizing a redundant power source, such as the combustion engine 122, on-board the UAV 100 during forward flight of the UAV 100 and/or at a threshold altitude. In the example of FIG. 2, the UAV 100 is shown to have engaged a payload 200 (e.g., an inventory item) that the UAV 100 is to carry, in flight, to a delivery location (e.g., a customer's shipping address) as part of a delivery mission. At time, t1, the UAV 100 is at ground level 202 with a payload 200 engaged by the inventory engagement mechanism 108. The location of the UAV 100 at time, t1, may be at a fulfillment center where inventory is stocked. The ground level 202 may be any level where the UAV 100 lands and from which it is then transported upwards (i.e., takes off). The ground level 202 may be the floor within a fulfillment center, a roof of the fulfillment center, and so on.

At time, t2, the UAV 100 takes off in flight by operating its propellers 102 to move the UAV 100 through the air vertically, or at least in a partially vertical direction. The power mode for lifting the UAV 100 in this manner may be the "battery-power mode" where the battery 118 provides power to the propeller motors 106. In the battery-power mode, the combustion engine 122 may be turned off, or the engine 122 may be idling so as to be at the ready for outputting power without having to start. In either case, the engine 122 does not provide any power in the battery-power mode.

At time, t3, the UAV 100 may reach a threshold altitude 204. The current altitude may be sensed by an altimeter (one of the UAV sensors 136) and provided to the power system controller 134 that, in response to receipt of the current altitude from the altimeter, compares the current altitude to the threshold altitude 204 to determine that the UAV 100 is at or above the threshold altitude 204. In response to determining that the UAV 100 is at or above the threshold altitude 204, the power system controller 134 may start the combustion engine 122 (if the engine 122 is not already running at idle), and thereafter, utilize the engine 122 to provide power to the propeller motors 106. In this scenario, the threshold altitude 204 may correspond to an altitude that is high enough above the ground level 202 so that humans at the ground level 202 will not notice any substantial noise and/or exhaust produced as a result of operating the combustion engine 122. After time, t3, the combustion engine 122 may be utilized to fly the UAV 100 to higher altitudes, and/or fly the UAV 100 in a forward direction (i.e., substantially horizontally). The substantially horizontal (forward) movement of the UAV 100 is shown by the transition from time, t3, to time, t4.

In some implementations, the threshold altitude 204 may correspond to a cruising altitude. The threshold altitude 204 used to trigger the use of the combustion engine 122 at the threshold altitude 204 or higher may be different from a cruising altitude. That is, the cruising altitude may be an altitude that is above an altitude where it is permitted to use the combustion engine 122. However, FIG. 2 shows a single threshold altitude 204 for ease of illustrating the various techniques described herein. Continuing with the "cruising altitude" scenario, once the UAV 100 reaches the cruising altitude, as determined via the altimeter, a navigation module 138 of the UAV 100 (See FIG. 1) may determine that the UAV 100 is to transition from substantially vertical movement to forward movement so that it may proceed toward a delivery location. This trigger event (i.e., determining that the UAV 100 is to begin flying forward or substantially horizontal relative to ground) may cause the power system controller 134 to switch to powering the propeller motors 106 using the combustion engine 122. The techniques illustrated by the schematic diagram of FIG. 2 may be advantageous where the combustion engine 122 is used for portions of a flight where the UAV 100 is above a minimum altitude (the threshold altitude 204), where the UAV 100 travels over great distances in a single direction (e.g., substantially horizontally), and/or where the UAV 100 is over largely uninhabited areas for a majority of the journey to a destination.

It is to be appreciated that, although FIG. 2 illustrates criteria for operating the UAV 100 in battery-power mode, such as during vertical take-off, during landing maneuvers, and/or below a threshold altitude, an emergency override control may allow for switching to engine-power mode and/or charging the battery 118 with the combustion engine 122 when the engine 122 would otherwise not be utilized in non-emergency situations. For example, if the battery 118 fails during takeoff, or when the UAV 100 is flying at a low altitude where the combustion engine 122 is normally not utilized, the power system controller 134 may initiate an override to utilize the combustion engine 122 to restore power to the UAV 100.

Figure 3:
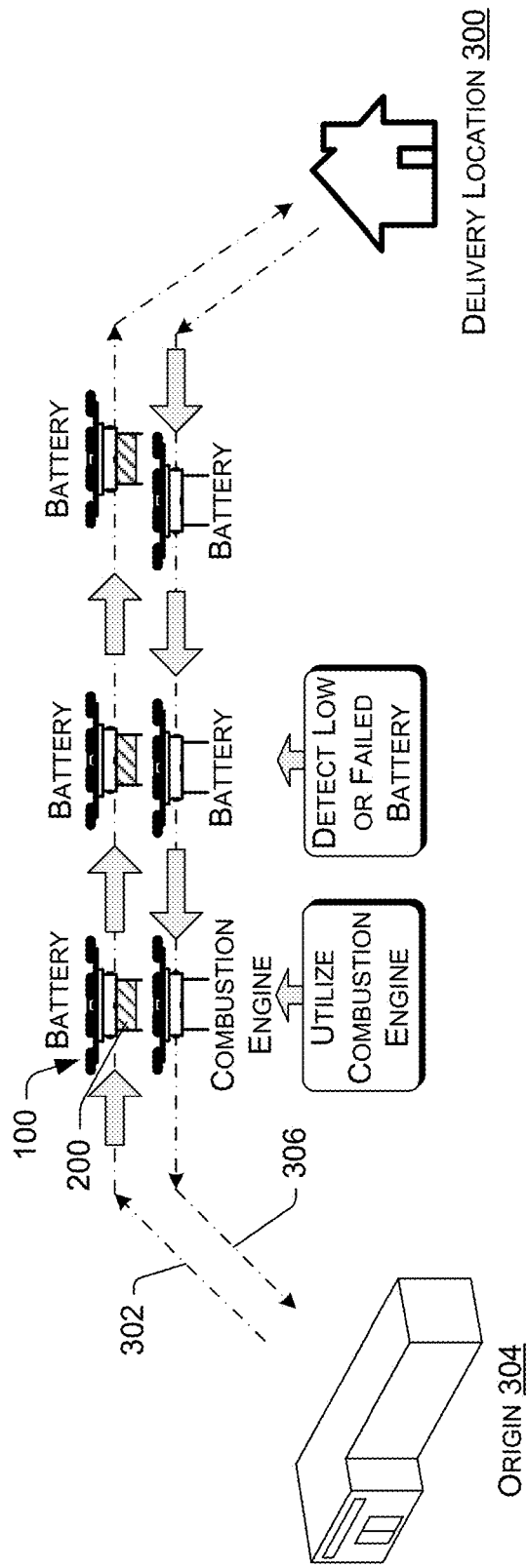
FIG. 3 is a schematic diagram of an example technique for selectively utilizing a redundant power source on-board the UAV during a portion of a round trip flight to deliver an item to a delivery location.

FIG. 3 is a schematic diagram of an example technique for selectively utilizing a redundant power source, such as the combustion engine 122, on-board the UAV 100 during a portion of a round trip flight to deliver an item to a delivery location 300 (e.g., a residential home). In the example of FIG. 3, the UAV 100 carrying the payload 200 is shown as flying along a first leg 302 of a round trip flight from an origin 304 (e.g., a fulfillment center) to the delivery location 300. The power system controller 134 may utilize the battery 118 for some or all of the first leg 302. For example, as described in FIG. 2, the cruising flight of the UAV 100 may utilize, at least partly, the combustion engine 122 to power the propeller motors 106 for forward flight, and/or the combustion engine 122 may be utilized above the threshold altitude 204. FIG. 3 illustrates an example scenario, during a second leg 306 (e.g., a return leg) of the round trip flight, where the battery 118 either fails or is depleted to a point where the charge level 120 falls below a threshold charge level, which may correspond to an arbitrary threshold, or a threshold that is determined to indicate an amount of charge needed to complete a remainder of the journey. For example, the UAV 100 may have 10 minutes of flight time left to complete a mission, and only 9 minutes of power remaining in the battery 118, the threshold charge level in this case being a charge level needed to complete the 10 minutes of remaining flight time.

The trigger event may be detected by the battery controller/monitor 126 of the power system 114 by monitoring the current and/or voltage associated with the battery 118. In response to this trigger event, the power system controller 134 may switch from battery-power mode to engine-power mode so that the combustion engine 122 provides power to the propeller motors 106 to complete the second leg 306 of the journey. In the case of a battery failure, it would not help to try and charge the inoperable battery 118, so the combustion engine 122 can provide power to the UAV 100 to continue propelling the UAV 100 in flight.

In the scenario where the charge level 120 of the battery 118 is detected, by the battery controller/monitor 126, to have fallen below a threshold level, at least one suitable response is to utilize the combustion engine 122 to charge the battery 118 so that a sufficient amount of energy can be stored in the battery 118 to complete the journey by operating the UAV 100 in battery-power mode. In this case, the combustion engine 122 is not utilized to power the propeller motors 106, but is instead utilized to charge the battery 118. The technique illustrated by FIG. 3 may be useful for scenarios where, despite a battery charge level 120 that is predicted to be sufficient for completing a mission, unforeseen circumstances (e.g., a strong head wind) may cause more rapid depletion of the charge level 120 than predicted. In this case, the selective use of the redundant power source can extend the flight time of the UAV 100 so that the UAV can complete the journey.

FIG. 4 is a schematic diagram of an example technique for selectively utilizing a redundant power source, such as the combustion engine 122, on-board the UAV 100 in defined areas. FIG. 4 depicts an area 400, which may correspond to a delivery area where UAVs delivery inventory items to various delivery locations within the area 400. FIG. 4 shows an example delivery location 400 where inventory (shown as the payload 200) is to be delivered by the UAV 100. The UAV 100 may begin is delivery mission from an origin 404, such as a fulfillment center where inventory is stocked, and may fly along a flight path 406 to the delivery location 402. Although it is not shown in FIG. 4, the UAV 100 may return along the same, or a similar flight path to the origin 404 after delivering the payload 200, or the UAV 100 may continue on to another delivery location if it is carrying multiple items that can be individually delivered to multiple delivery locations.

The area 400 may include one or more sub-areas, such as sub-area 408 and sub-area 410 that are defined by respective geo-fences. A pre-defined geo-fence may create a virtual perimeter around a real-world geographic area, such as the sub-areas 408 and 410. In reference to FIG. 1, the architecture 112 is shown is including a non-transitory computer readable memory 140. The memory 140 may be configured to store executable instructions and data that are accessible by various modules and controllers of the architecture 112, such as the power system controller 134, the navigation module 138, and the like. In various implementations, the memory 140 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are stored within the memory 140. In other implementations, program instructions and/or other data may be received, sent, or stored upon different types of computer-accessible media, such as non-transitory media, or on similar media separate from the memory 140. Generally speaking, a non-transitory, computer readable storage medium may include storage media or memory media such as flash memory (e.g., solid state memory), magnetic or optical media (e.g., disk) coupled to various components of the architecture 112 via the bus 116. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via communications connections 142.

The memory 140 may include various data stores for maintaining data items. For example, map data (e.g., latitudes, longitudes, landmarks, road networks, etc.) may be stored in the memory 140 to define the area 400 of FIG. 4. Geo-fence data may also be stored in the memory 140 in association with map data to define the boundaries of the sub-areas 408 and 410 shown in FIG. 4. The memory 140 may also store flight paths used by the navigation module 138 to control the flight of the UAV 100. Order details relating to inventory that the UAV 100 may be carrying may also be stored in the memory 140. Order details may include identifiers of one or more items to be shipped to a delivery location, such as the delivery locations 300, 402, a shipping address of the delivery location, a weight of the item to be delivered, and other transaction/order details.

Referring again to FIG. 4, as the UAV 100 is flying along the flight path 406, it may utilize a location sensor (e.g., a GPS receiver) to determine a current latitude and longitude of the UAV 100. The current location may be sampled at multiple different times (e.g., periodically, such as every second), and received by the power system controller 134. The power system controller 134 may compare the received location coordinates to the coordinates associated with the sub-areas 408 and 410 to determine whether the UAV 100 is currently inside or outside a geo-fence defining the sub-areas 408 and 410. In some implementations the sub-areas 408 and 410 may correspond to densely populated areas, such as urban areas, residential neighborhoods, etc. Accordingly, the power system controller 134, upon determining a trigger event that the UAV 100 is within the geo-fence defining sub-area 408, may power the UAV 100 in battery-power mode so as to refrain from using the combustion engine 122 within the sub-area 408 (e.g., a residential neighborhood). When the UAV 100 is outside of the sub-area 408, the power system controller 134 may utilize the combustion engine 408 to power the propeller motors 106 and/or charge the battery 118.

It is to be appreciated that, although FIG. 4 illustrates criteria for operating the UAV 100 in battery-power, such as when the UAV 100 is within a geo-fence, an emergency override control may allow for switching to engine-power mode and/or charging the battery 118 with the combustion engine 122 when the engine 122 would otherwise not be utilized in non-emergency situations. For example, if the battery 118 fails when the UAV 100 is flying within a geo-fence where the combustion engine 122 is normally not utilized, the power system controller 134 may initiate an override to utilize the combustion engine 122 to restore power to the UAV 100.

Returning to FIG. 1, the remaining components of the architecture 112 will be further described. The architecture 112 is shown as including the navigation module 138, the memory 140, the communications connections 142, and a propeller motor controller(s) 144. The navigation module 138 is generally configured to control the flight of the UAV 100 along a flight path that is stored in the memory 140. The navigation module 138 may utilize the UAV sensors 136 (e.g., a location sensor, an altimeter, a speedometer, an IMU, etc.) to navigate the UAV 100 along a flight path, controlling how the UAV 100 maneuvers along a flight path as it monitors location, altitude, speed, acceleration, pitch, roll, yaw, and other relevant parameters provided by the UAV sensors 136.

The propeller motor controller(s) 144 is configured to communicate with the navigation module 138 to adjust the power provided to each propeller motor 106. In this manner, the rotational speed and direction of the propellers 102 may be dynamically adjusted to propel and guide the UAV 100 along a determined flight path. The propeller motor controller(s) 144 may decide, based on input from the navigation module 138, how to operate (e.g., how fast, which ones) the propellers motors 106 and corresponding propellers 102 to move the UAV 100 along a flight path. The propeller motor controller(s) 144 may also determine the distribution of electrical energy to provide to each of the propeller motors 106. The propeller motor controller(s) 144 may be configured to rapidly change RPMs of the propeller motors 106 so that precise movements of the UAV 100 can be performed during certain types of flight (e.g., takeoff and landing of the UAV 100).

The communications connections 142 may be configured to allow data to be exchanged between the UAV 100 and other devices. For example, the UAV 100 may communicate over a network (e.g., wide area networks (WANs) or local area networks (LANs) and including cable networks, the Internet, cellular networks, wireless networks, or any suitable public or private network), or over short range wireless protocols (e.g., Bluetooth®), or wired connections (e.g., USB cables), and so on. For example, the communications connections 142 may enable wireless communication between numerous UAVs.

Those skilled in the art will appreciate that the UAV 100 of FIG. 1 is merely illustrative and is not intended to limit the scope of the present disclosure. For example, the UAV 100 may include a mechanism to mitigate noise generated by the combustion engine 122 during operation of the engine 122, such as a muffler system that reduces the noise produced by the combustion engine 122. As another example, the UAV 100 may include emissions equipment to filter or reduce noxious exhaust fumes produced by the engine 122. In addition, the engine 122 may be mounted to the frame 104 of the UAV 100 using a damping mechanism (e.g., polymers, rubber, or the like) placed at mounting points that are tuned to the vibrations produced by the engine 122 during operation. In this manner, vibration produced by running the engine 122 may be dampened or otherwise mitigated with respect to the remaining components of the UAV 100 by isolating the engine 122 via the mounting structure. Furthermore, the UAV 100 may include additional auxiliary power sources in addition to the combustion engine 122. Such additional auxiliary power sources may include, but are not limited to, a solar panel, a super capacitor, a fuel cell, or a combination thereof.

Example Processes

FIGS. 5-8 are flow diagrams of illustrative processes for implementing the techniques described herein. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 for selectively utilizing a redundant power source, such as the combustion engine 122, on-board the UAV 100 in response to a trigger event. For discussion purposes, the process 500 is described with reference to the UAV 100 and the architecture 112 of FIG. 1.

At 502, power may be provided to the propeller motors 106 of the UAV 100 from the battery 118. The provisioning of battery power at 502 may be controlled by the power system controller 134, and may correspond to a default power mode (i.e., a default battery-power mode). Furthermore, the UAV 100 may be operating in any suitable type of flight at 502, such as taking off from ground level 202, cruising flight, landing, or the like.

At 504, a determination is made by the power system controller 134 as to whether a trigger event has occurred. The trigger event may be a variety of events or criteria, including, without limitation, determining that the UAV 100 is to begin flying substantially horizontally relative to ground, determining that the battery 118 is inoperable, determining that an altitude of the UAV 100 is above a threshold altitude 204, determining that a latitude and a longitude of the UAV 100 is not within a geo-fence, determining that a weight of a payload 200 carried by the UAV 100, or a total weight of the UAV 100 and the payload 200, is above a threshold weight, determining that a power output to keep the UAV 100 from lifting or falling vertically is above a threshold power output, determining that an ambient temperature of the environment is below a threshold temperature, determining that a charge level 120 of the battery 118 has dropped below a threshold charge level, determining that the charge level 120 of the battery 118 is insufficient for providing power for an entirety of a remaining flight time of the UAV 100, determining that the UAV is to begin flying at a predetermined speed above a threshold speed, and similar trigger events. The trigger events may be determined from sensed parameters received from the UAV sensors 136 and/or the battery controller/monitor 126, and from data stored in the memory 140 (e.g., the geo-fence data).

If it is determined at 504 that a trigger event has occurred, the "yes" route is followed to 506 where the power system controller 134 utilizes the combustion engine 122 to charge the battery 118 or to power the propeller motors 106 of the UAV 100. It is to be appreciated that, in some instances, the type of trigger event may dictate whether the responsive action at 506 involves charging the battery 118 or powering at least the propeller motors 106 of the UAV 100. For example, if the trigger event is one that indicates an emergency situation where the battery 118 cannot power the UAV 100 (e.g., the battery 118 has failed), the responsive measure at 506 may be to use the combustion engine 122 to power the propeller motors 106 rather than to charge the battery 118. In other situations, such as when the trigger event at 504 does not involve an emergency situation calling for immediate power restoration to the propeller motors 106, the responsive measure at 506 may be to charge the battery 118. Moreover, when the battery 118 is fully charged notwithstanding the occurrence of a trigger event at 504, the responsive measure at 506 would be to use the combustion engine 122 to power the propeller motors 106.

In some implementations, when the combustion engine 122 is used to charge the battery 118 at 506, the UAV 100 may, out of an abundance of caution, divert from a flight path and land in a safe spot (in an open field, on the top of a building, etc.) so that it can recharge the battery 118 to a sufficient charge level 120 before continuing on the flight path. This "safe-charging" technique may be reserved for extreme situations (e.g., where the charge level 120 has reached a critically low level such that it is deemed unsafe to continue flying the UAV 100 without replenishing the battery 118.

FIG. 6 is a flow diagram of an illustrative process 600 for selecting an air-to-fuel ratio for a combustion engine 122 on-board the UAV 100 based on altitude. For discussion purposes, the process 600 is described with reference to the UAV 100 and the architecture 112 of FIG. 1.

At 602, an altimeter (one of the UAV sensors 136) may determine a current altitude of the UAV 100. The altitude determination may be based on barometric pressure, or any suitable alternative technique. The determination at 602 may occur at any point in time during operation (e.g., flight) of the UAV 100. For example, the altimeter may be configured to continuously sample altitude measurement as the UAV 100 flies along a flight path.

At 604, the power system controller 134 may select an air-to-fuel ratio for operating a combustion engine 122 on-board the UAV 100. In some implementations, the memory 140 may store optimum air-to-fuel ratios for various altitudes in a range of altitudes that the UAV 100 typically encounters during flight. The air-to-fuel ratios may need adjustment across varying altitudes due to the oxygen content of the air at different altitudes. The optimum air-to-fuel ratio may be different for different types of fuel used by the combustion engine 122. Accordingly, based on the type of fuel and the altitude determined at 602, the power system controller 134 may select an appropriate air-to-fuel ratio to run the combustion engine 122 at maximum efficiency.

At 606, the power system controller 134 may operate the combustion engine 122 with the air-to-fuel ratio that was selected at 604. This may be accomplished by causing a corresponding amount of fuel to be injected into the engine 122 for combustion therein. The operation of the combustion engine 122 at 606 may include operating the combustion engine 122 for charging the battery 118 and/or powering components (e.g., the propeller motors 106) of the UAV 100. Furthermore, the process 600 may iterate as the UAV 100 changes altitude during flight.

Figures 7, 8:
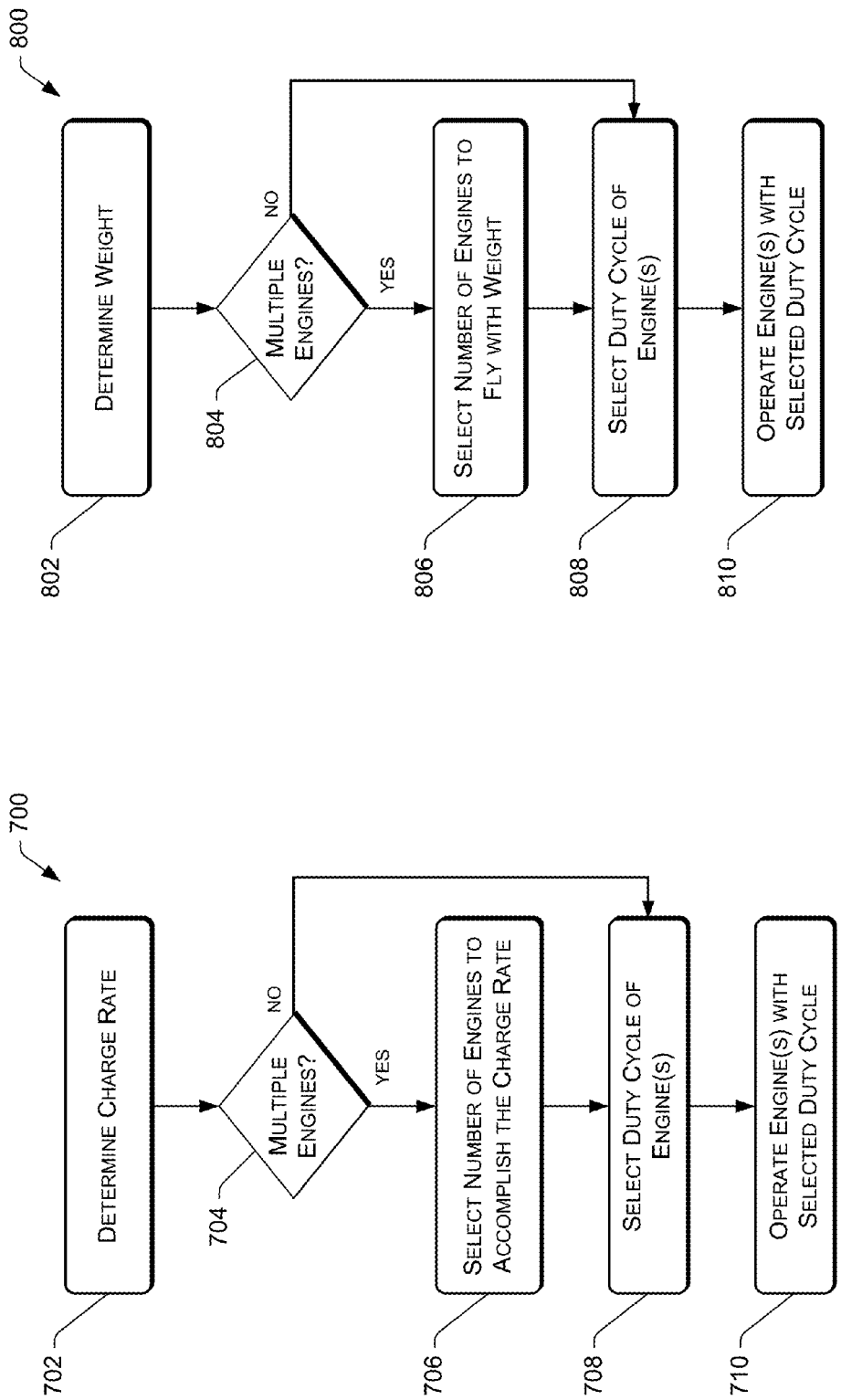
FIG. 7 is a flow diagram of an illustrative process for selecting a number of combustion engines, and/or selecting a duty cycle of the selected engine, to accomplish a charge rate for charging a battery on-board the UAV.
FIG. 8 is a flow diagram of an illustrative process for selecting a number of combustion engines, and/or a duty cycle of the selected engine, based on a weight of a payload carried by the UAV or the total weight of the UAV.

FIG. 7 is a flow diagram of an illustrative process 700 for selecting a number of combustion engines 122, and/or selecting a duty cycle of the selected engine 122, to accomplish a charge rate for charging a battery 118 on-board the UAV 100. For discussion purposes, the process 700 is described with reference to the UAV 100 and the architecture 112 of FIG. 1.

At 702, a charge rate is determined for charging the battery 118. For example, in response to the power system controller 134 determining that the battery 118 is to be charged, such as when the charge level 120 drops below a threshold charge level, and/or the charge level 120 is determined to be insufficient to complete a remainder of a mission in battery-power mode, the battery controller/monitor 126 may determine a rate at which the battery 118 is to be charged. The charge rate may be specified in any suitable manner that generally describes an amount of energy to be stored in the battery 118 per unit time. Thus, if the goal is to charge the battery 118 from its current charge level 120 to a maximum capacity level within 5 minutes, the charge rate determined at 702 may be a rate that will accomplish that objective.

At 704, a determination is made as to whether multiple combustion engines 122 are to be used to charge the battery 118 at the charge rate determined at 702. The decision at 704 may be based on the charge rate that can be accomplished by a single combustion engine 122 such that, if the charge rate determined at 702 is above a maximum charge rate that can be provided by a single combustion engine 122, the yes route is followed from 704. Alternatively, the decision at 704 may be based on an efficiency metric. That is, it may be more efficient in terms of the amount of fuel consumed by the engines 122 to charge the battery 118 with multiple engines 122 as opposed to a single engine 122. If it is determined at 704 that multiple engines 122 are to be used to charge the battery 118, the process 700 may proceed to 706 where a number of engines 122 to accomplish the charge rate are selected. For example, if the charge rate determined at 702 is a high charge rate (e.g., when the battery 118 is to be replenished within a very short amount of time), a relatively higher number (e.g., 3, 4, 5, etc.) of engines 122 may be selected at 706, as compared to a lower charge rate where a smaller number (e.g., 2 engines 122) are suitable for accomplishing the charge rate. Again, the number of engines 122 selected at 706 may be based on the maximum charge rate that can be supplied by each individual engine 122, or resource efficiency (e.g., burning a minimum amount of fuel while accomplishing the charge rate), and so on.

At 708, regardless of whether a single engine 122 or multiple engines 122 are to be used to charge the battery 118, a duty cycle of the engine 122 may be selected for running the engine 122 at the selected duty cycle for charging the battery 118. The duty cycle of a combustion engine 122, as used herein, refers to the amount of time that the fuel injectors of the engine 122 are switched on, and it can be expressed as a ratio or a percentage. For example, a duty cycle of 100% corresponds to the fuel injector constantly operating as the engine 122 is running, which generally corresponds to the engine 122 running at maximum output. The duty cycle of an idle engine 122 may be a few percent. Thus, the power system controller 134 may be configured to control the duty cycle of the engine 122 at 708 to accomplish the charge rate determined at 702. In one illustrative example, the charge rate determined at 702 may be a charge rate that a single combustion engine 122 can accomplish while running at 60% duty cycle. This data may be retrieved from the memory 140 and used for the selection of the number of engines at 706 and the duty cycle at 708.

At 710, the power system controller 134 may operate the combustion engine 122 at the duty cycle selected at 708 to charge the battery 118. In some embodiments, if one or more of the engines 122 selected for operation at 710 fail to start or are otherwise rendered inoperable after starting, the power system controller 134 may select another engine 122, if available on-board the UAV 100, as a substitute for the failed engine 122. Additionally, or alternatively, upon operating the engine 122 at 710, the power output and/or charge rate may be monitored in real-time to determine whether the power output and/or charge rate is sufficient for accomplishing the task at hand (in this case, charging the battery 118 at the charge rate determined at 702). If the power output and/or charge rate is not at the expected level, the power system controller 134 may dynamically adjust the duty cycle of the engine 122 and/or turn on/off individual ones of the engines 122 in order to adjust the power output and/or charge rate to a suitable level. The process 700 allows a UAV 100 having multiple engines 122 to accomplish a variety of charge rates when charging the battery 118, and further allows the UAV 100 to conserve resources (e.g., fuel) by selecting an optimal number of engine 122 to utilize, and the duty cycle to utilize for the selected number of engines 122.

FIG. 8 is a flow diagram of an illustrative process 800 for selecting a number of combustion engines 122, and/or a duty cycle of the selected engine 122, based on a weight of a payload 200 carried by the UAV 100 or the total weight of the UAV 100. For discussion purposes, the process 800 is described with reference to the UAV 100 and the architecture 112 of FIG. 1.

At 802, a weight of a payload 200 carried by the UAV 100 or the total weight of the UAV 100 may be determined. The determination at 802 may be accomplished in a variety of ways. In an implementation, the weight of the UAV 100 without a payload may be predetermined (e.g., at the time of manufacture) and stored in the memory 140 of the UAV 100. In this scenario, when the UAV 100 engages a payload 200 (e.g., an inventory item) with the inventory engagement mechanism 108, the UAV 100 may determine the weight of the payload 200 in order to determine an overall weight of the UAV 100 while carrying the payload 200. The UAV sensors 136 may include a payload weight sensor that acts as a traditional scale while the UAV 100 hovers above ground level 202 at a fixed altitude. Alternatively, the UAV 100 may receive order details that specify the weight of the payload 200 it is carrying through various channels. One manner of obtaining such information is through the communications connections 142 (e.g., receiving, over the Internet or a cellular network, order details from a server that processed a transaction for the items constituting the payload 200). Alternatively, the UAV 100 may utilize a scanner (one of the UAV sensors 136 to scan a machine-readable code (e.g., a quick response (QR) code, bar code, etc.) on the payload itself, the machine-readable code containing information about the weight of the payload 200.

In another implementation, the power system controller 134 may be receive data from a UAV sensor 136 that detects the power output required to keep the UAV 100 hovering above ground level 202 at a fixed altitude while carrying the payload 200. The power output, given the acceleration of gravity, can be used to calculate the overall weight of the UAV 100 and the payload 200 it is carrying.

At 804, a determination is made as to whether multiple combustion engines 122 are to be used to power the propeller motors 106 of the UAV 100 given the weight determined at 802. The decision at 804 may be based on a maximum weight that can be flown through the air using a single combustion engine 122 such that, if the weight determined at 802 is above a maximum weight that can be flown using a single combustion engine 122, the yes route is followed from 804. Alternatively, the decision at 804 may be based on an efficiency metric. That is, it may be more efficient in terms of the amount of fuel consumed by the engines 122 to fly a UAV 100 that weighs a certain amount with multiple engines 122 as opposed to a single engine 122. If it is determined at 804 that multiple engines 122 are to be used to power the propeller motors 106, the process 800 may proceed to 806 where a number of engines 122 are selected. For example, if the weight of the UAV 100 and/or payload 200 is relatively heavy, a relatively higher number (e.g., 3, 4, 5, etc.) of engines 122 may be selected at 806, as compared to a lighter UAV 100 and/or payload 200 where a smaller number (e.g., 2 engines 122) are suitable for flying the UAV 100. Again, the number of engines 122 selected at 806 may be based on the maximum weight that can be flown using a single engine 122, or resource efficiency (e.g., burning a minimum amount of fuel while flying the UAV 100), and so on.

At 808, regardless of whether a single engine 122 or multiple engines 122 are to be used to power the propeller motors 106, a duty cycle of the engine 122 may be selected for running the engine 122 at the selected duty cycle for powering the propeller motors 106. In one illustrative example, the weight determined at 802 may be weight that can be flown using a single combustion engine 122 running at 40% duty cycle. This data may be retrieved from the memory 140 and used for the selection of the number of engines at 806 and the duty cycle at 808.

At 810, the power system controller 134 may operate the combustion engine 122 at the duty cycle selected at 708 to power the propeller motors 106. In some embodiments, if one or more of the engines 122 selected for operation at 810 fail to start or are otherwise rendered inoperable after starting, the power system controller 134 may select another engine 122, if available on-board the UAV 100, as a substitute for the failed engine 122. Additionally, or alternatively, upon operating the engine 122 at 810, the power output may be monitored in real-time to determine whether the power output is sufficient for accomplishing the task at hand (in this case, powering the UAV 100 at the weight determined at 802). If the power output is not at the expected level, the power system controller 134 may dynamically adjust the duty cycle of the engine 122 and/or turn on/off individual ones of the engines 122 in order to adjust the power output to a suitable level. The process 800 allows a UAV 100 having multiple engines 122 to fly the UAV 100 carrying a variety of payloads that are of different weights, and further allows the UAV 100 to conserve resources (e.g., fuel) by selecting an optimal number of engine 122 to utilize, and the duty cycle to utilize for the selected number of engines 122.

Those skilled in the art will appreciate that the UAV 100 and the computing architecture 112 is merely illustrative and is not intended to limit the scope of the present disclosure. In particular, any combination of hardware or software that can perform the indicated functions may be included as part of the UAV 100 and/or the architecture 112. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Some or all of the system components or data structures may also be stored (e.g., as instructions or structured data) on a non-transitory, computer-accessible medium or a portable article to be read by an appropriate drive on the UAV 100. Various implementations may further include receiving, sending, or storing instructions and/or data implemented in accordance with the foregoing description upon a computer-accessible medium. Accordingly, the techniques described herein may be practiced with other configurations.

In various implementations, the controllers of the UAV 100 (e.g., the battery controller/monitor 126, the power system controller 134, and/or the motor controller(s) 144) may include their own processor(s) and memory, or the controllers may have access to processor(s) and memory elsewhere in the architecture 112. Any suitable processor architecture may be utilized to implement the techniques and functions described herein, such as a uniprocessor system including one processor, or a multiprocessor system including several processors, with the processor(s) being any suitable processor capable of executing instructions. For example, in various implementations, the controllers of the UAV 100 may utilize general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
propellers to generate thrust to propel the UAV in air;
propeller motors, each propeller motor to rotate at least one of the propellers;
a power system comprising:
a battery assembly to provide power to the propeller motors;
a combustion engine configured to convert potential energy of a fuel stored on-board the UAV into kinetic energy, the combustion engine having:
an electric starting motor to start the combustion engine; and
a starter battery to provide power to the electric starting motor;
a generator, coupled to the combustion engine, to convert the kinetic energy from the combustion engine into electrical energy;
a navigation module to estimate a remaining flight time of the UAV to complete a journey; and
a power system controller to selectively start the combustion engine using the starter battery and the electric starting motor of the combustion engine upon determining that:
a charge level of the battery assembly is less than a threshold charge level; or
the battery assembly is inoperable,
wherein the power system controller is further configured to activate the combustion engine based at least in part on determining that the charge level of the battery assembly is insufficient to provide power for an entirety of the remaining flight time.

2. The UAV of claim 1, wherein the power system further comprises a battery controller to transfer the electrical energy from the generator to the battery assembly to charge the battery, and wherein the power system controller is further configured to selectively utilize the combustion engine to:
   charge the battery assembly via the battery controller; or
   power at least one of the one or more propeller motors.

3. The UAV of claim 1, wherein the combustion engine is connected to a propeller configured to propel the UAV in a horizontal direction.

4. An unmanned aerial vehicle (UAV) comprising:
   one or more propeller motors configured to rotate one or more propellers of the UAV;
   a navigation module configured to estimate a remaining flight time of the UAV to complete a journey; and
   a power system comprising:
      a battery to provide power to the one or more propeller motors;
      a combustion engine configured to convert potential energy of a fuel stored on-board the UAV into kinetic energy;
      a generator coupled to the combustion engine to convert the kinetic energy from the combustion engine into electrical energy; and
      a power system controller configured to selectively operate the combustion engine to provide the electrical energy from the generator to charge the battery or to power at least one of the one or more propeller motors,
      wherein the power system controller is further configured to operate the combustion engine based at least in part on determining that a charge level of the battery is insufficient to provide power for an entirety of the remaining flight time.

5. The UAV of claim 4, wherein the combustion engine comprises:
   an electric starting motor to start the combustion engine; and
   a starter battery to provide power to the electric starting motor.

6. The UAV of claim 4, wherein the power system controller is further configured to control a distribution of power provided from the battery and power provided from the combustion engine.

7. The UAV of claim 4, wherein the power system further comprises a battery controller to transfer the electrical energy from the generator to the battery to charge the battery.

8. The UAV of claim 4, wherein the power system further comprises a battery monitor to monitor the charge level of the battery, and wherein the power system controller is further configured to operate the combustion engine based at least in part on determining that the charge level of the battery is less than a threshold level.

9. The UAV of claim 4, wherein the navigation module is further configured to determine that the UAV is to begin flying substantially horizontally relative to ground, wherein the power system controller is configured to utilize the kinetic energy from the combustion engine to power at least one of the propeller motors that provides forward thrust to the UAV based as least in part on determining that the UAV is to begin flying substantially horizontally relative to ground.

10. The UAV of claim 4, further comprising an altimeter to determine an altitude of the UAV, wherein the power system controller is configured to power the at least one propeller motor with the electrical energy from the generator based at least in part on determining that the altitude of the UAV meets or exceeds a threshold altitude.

11. The UAV of claim 10, wherein the power system controller is further configured to select an air-to-fuel ratio utilized by the combustion engine based at least in part on the altitude of the UAV.

12. The UAV of claim 4, further comprising a location sensor to measure a latitude and a longitude of the UAV, wherein the power system controller is further configured to:
   compare the measured latitude and the longitude of the UAV to geo-fence information; and
   power the at least one propeller motor from the electrical energy provided by the generator based at least in part on comparing the measured latitude and the longitude of the UAV to the geo-fence information.

13. The UAV of claim 4, wherein the power system further comprises:
   at least one additional combustion engine, resulting in the power system comprising a plurality of combustion engines; and
   a power system controller to selectively utilize individual ones of the plurality of combustion engines.

14. The UAV of claim 13, wherein the power system controller is further configured to utilize a predetermined number of the plurality of combustion engines based at least in part on: (i) a weight of a payload carried by the UAV, (ii) a total weight of the UAV and the payload, or (iii) a charge rate that is to be used to charge the battery.

15. A method to operate a power system of an unmanned aerial vehicle (UAV), the method comprising:
   providing power to one or more propeller motors of the UAV from a battery on-board the UAV;
   determining, by a power system controller of the UAV, that a trigger event has occurred; and
   based at least in part on the determining that the trigger event has occurred, operating a combustion engine on-board the UAV to charge the battery or power at least one propeller motor of the UAV,
   wherein the trigger event includes at least determining that a charge level of the battery is insufficient for providing power for an entirety of an estimated remaining flight time of the UAV.

16. The method of claim 15, wherein the combustion engine is utilized to power the at least one propeller motor based at least in part on the determining the trigger event, and wherein the trigger event further comprises at least one of:
   determining that the battery is inoperable;
   determining that an altitude of the UAV is above a threshold altitude;
   determining that a latitude and a longitude of the UAV is outside of a geo-fence; or
   determining that a horizontal component of thrust is desired.

17. The method of claim 15, wherein the combustion engine is utilized to charge the battery based at least in part on the determining the trigger event, and wherein the trigger event further comprises
   determining that the charge level of the battery has dropped below a threshold charge level.

18. The method of claim 15, further comprising:
   selectively engaging a generator with the combustion engine to provide electrical power to the UAV; and
   rotating a propeller with the combustion engine to provide thrust to the UAV.

19. The UAV of claim 1, wherein the power system controller is further configured to control a charge rate that is to be used to charge the battery based at least in part on a threshold charge level and an amount of charging time to reach the threshold charge level of the battery.

20. The UAV of claim 4, wherein the one or more propellers of the UAV are configured to generate thrust to propel the UAV in air, and wherein the combustion engine is mechanically isolated from the one or more propellers of the UAV.

* * * * *